(12) United States Patent
Danker et al.

(10) Patent No.: US 7,516,472 B2
(45) Date of Patent: Apr. 7, 2009

(54) USING BROADCAST TELEVISION AS A PORTAL FOR VIDEO ON DEMAND SOLICITATION

(75) Inventors: Daniel Danker, Sunnyvale, CA (US); Peter T. Barrett, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1095 days.

(21) Appl. No.: 10/377,387

(22) Filed: Feb. 28, 2003

(65) Prior Publication Data

US 2004/0172662 A1 Sep. 2, 2004

(51) Int. Cl.
*H04N 7/173* (2006.01)
*H04N 7/16* (2006.01)
*G06F 3/00* (2006.01)
*H04N 7/10* (2006.01)
*H04N 17/00* (2006.01)

(52) U.S. Cl. ............................. 725/87; 725/9; 725/14; 725/36; 725/37; 725/86; 725/110; 348/180

(58) Field of Classification Search ............. 725/87, 725/86, 9, 14, 36, 37, 110; 348/180
See application file for complete search history.

(56) References Cited

U.S. PATENT DOCUMENTS

| | | | | |
|---|---|---|---|---|
| 6,124,854 A | * | 9/2000 | Sartain et al. | 715/716 |
| 6,651,251 B1 | * | 11/2003 | Shoff et al. | 725/37 |
| 7,178,162 B2 | * | 2/2007 | Martinolich et al. | 725/135 |
| 7,237,250 B2 | * | 6/2007 | Kanojia et al. | 725/36 |
| 2003/0145331 A1 | * | 7/2003 | Escobar et al. | 725/110 |
| 2003/0159142 A1 | * | 8/2003 | Howe et al. | 725/38 |
| 2004/0103429 A1 | * | 5/2004 | Carlucci et al. | 725/32 |

* cited by examiner

*Primary Examiner*—Hoang-Vu A Nguyen-Ba
(74) *Attorney, Agent, or Firm*—Lee & Hayes, PLLC

(57) ABSTRACT

Systems and methods are described for using broadcast television systems as an implicit portal for solicitation of video on demand programs. A viewing device is monitored for the occurrence of a specific event, such as a channel change or the detection of a trigger mechanism programmed into a content program. When the event is detected, a user is prompted to notify the user of the availability of video on demand content related to the channel or program the user is watching. If the user indicates that he is interested in such content, available video on demand programs are presented to the user for selection. Means are also provided to prevent redundant and other unwanted prompts from appearing on the user's display.

36 Claims, 6 Drawing Sheets

USING BROADCAST TELEVISION AS A PORTAL FOR VIDEO ON DEMAND SOLICITATION

TECHNICAL FIELD

The systems and methods described herein relate to content broadcasting systems. More particularly, the described systems and methods relate to using broadcast television as an implicit portal for solicitation of video on demand programs.

BACKGROUND

Video content that is available through a content broadcast system is typically displayed to system users in a list or grid format. A user navigates through the list or grid to select a program to view. As the amount of video content that is available increases, lists and grids become inefficient and ineffective in expressing the full set of content available at any given time. Providing a more efficient way to make users aware of programs available would increase viewership and user satisfaction.

SUMMARY

Systems and methods are described for using broadcast television systems as an implicit portal for solicitation of video on demand programs. A viewing device is monitored for the occurrence of a specific event, such as a channel change or the detection of a trigger mechanism programmed into a content program. When the event is detected, a user is prompted to notify the user of the availability of video on demand content related to the channel or program the user is watching. If the user indicates that he is interested in such content, available video on demand programs are presented to the user for selection.

BRIEF DESCRIPTION OF THE DRAWINGS

The same numbers are used throughout the drawings to reference like features and components.

DETAILED DESCRIPTION

Systems and methods for using broadcast television as an implicit portal for video on demand solicitation are described below. Although the described techniques are described with reference to video on demand, it is noted that the same principles may be applied to regular broadcasts, and such an implementation will be described in greater detail below. An exemplary broadcast system architecture and an exemplary client device in a television-based system are initially described with reference to FIG. 1 and FIG. 2, respectively, to first describe an operating environment on which the described techniques may be implemented.

Exemplary Broadcast System

Figure 1:
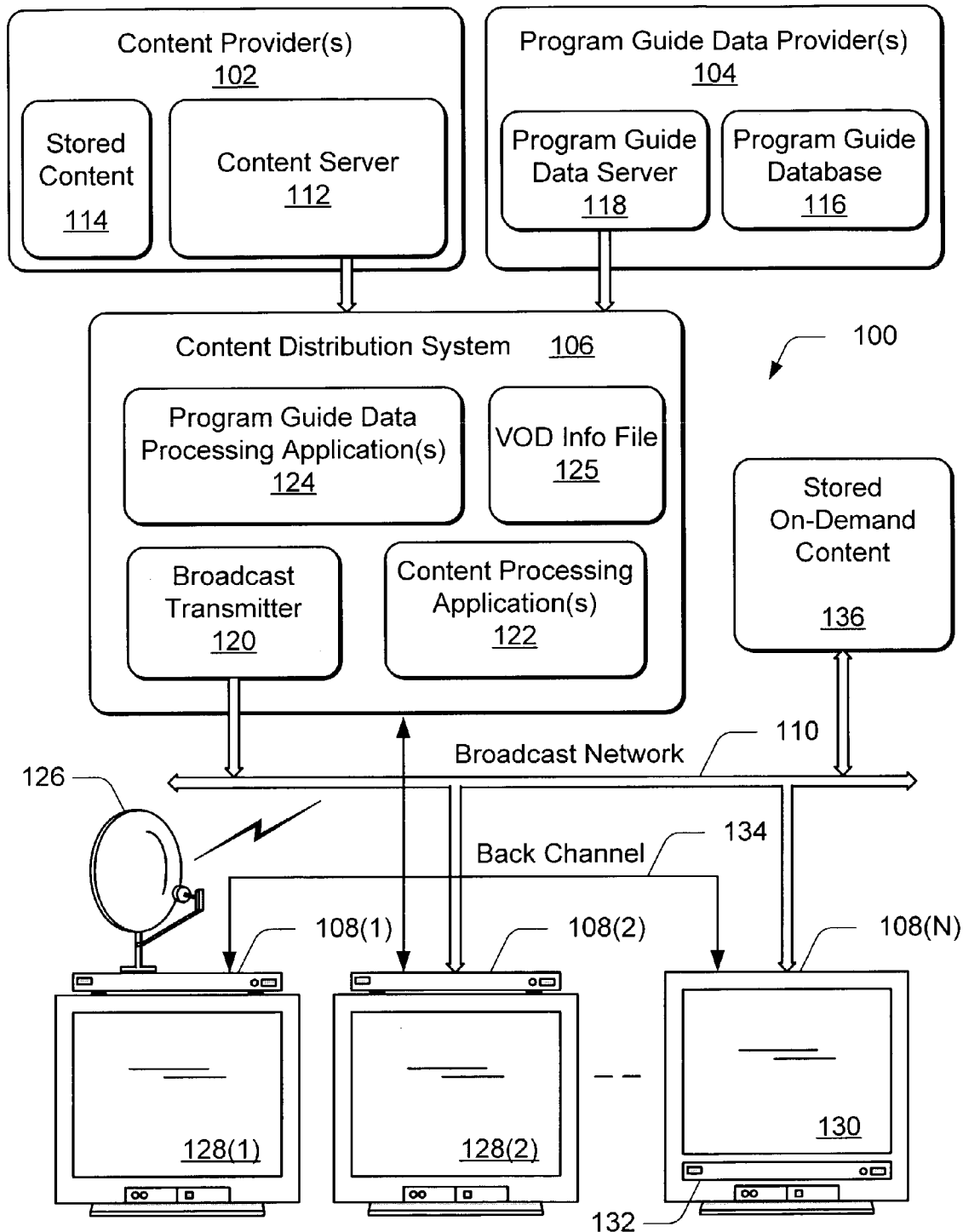
FIG. 1 illustrates an exemplary system architecture in which the described systems and methods can be implemented.

FIG. 1 illustrates an exemplary system 100 in which a technique for using broadcast television as an implicit portal for video on demand solicitation may be implemented. System 100 facilitates distribution of content and program guide data to multiple viewers. The system 100 includes one or more content providers 102, one or more program guide data providers 104, a content distribution system 106, and multiple client devices 108(1), 108(2), . . . , 108(N) coupled to the content distribution system 106 via a broadcast network 110.

A content provider 102 can be implemented as a satellite operator, a network television operator, a cable operator, and the like. A content provider 102 includes a content server 112 to control distribution of stored content 114, such as movies, television programs, commercials, music, and similar audio, video, and/or image content from content provider 102 to the content distribution system 106. The stored content 114 may also include content available for purchased, such as pay-per-view and/or video-on-demand content. Additionally, content server 112 controls distribution of live content (e.g., content that was not previously stored, such as live feeds) and/or content stored at other locations to the content distribution system 106. The content distribution system 106 is representative of a headend service and/or program data center that provides content and program guide data to multiple subscribers (e.g., client devices 108).

A program guide data provider 104 includes a program guide database 116 and a program guide data server 118. The program guide database 116 stores program guide data that is used to generate an electronic or interactive program guide (or "program guide"). Program guide data can include a program title, program broadcast day(s) to identify which days of the week the program will be broadcast, program start times(s) to identify a time that the program will be broadcast on the particular day or days of the week, and a program category.

A program guide data provider 104 transmits program guide data to the program guide data server 118, which processes the program guide data prior to distribution to generate a published version of the program guide data which can contain programming information for all broadcast channels and on-demand content listings for one or more days.

Content distribution system 106 includes a broadcast transmitter 120, one or more content processing applications 122, and one or more program guide data processing applications 124. Broadcast transmitter 120 broadcasts signals, such as cable television signals, across broadcast network 110. Broadcast network 110 can include a cable television network, RF, microwave, satellite, and/or data network, such as the Internet, and may also include wired or wireless transmission media using any broadcast format or broadcast protocol. Additionally, broadcast network 110 can be any type of network, using any type of network topology and any network communication protocol, and can be represented or otherwise implemented as a combination of two or more networks.

A content processing application 122 processes the content received from a content provider 102 prior to transmitting the content across broadcast network 110. Similarly, a program guide data processing application 124 processes the program guide data received from a program guide data provider 104 prior to transmitting the program guide data across broadcast network 110. A particular content processing application 122 may encode, or otherwise process, the received content into a format that is understood by the multiple client devices 108 which are coupled to broadcast network 110.

The content distribution system 106 also stores a video on demand (VOD) information file 125. The VOD information file 125 stores information about video on demand content programs available through the content distribution system 106. The information includes, but is not limited to, program titles, program descriptions, run time, price, etc. The VOD file 125 may be requested by a client device 108 to be downloaded over the broadcast network 110. Although shown as a single file, it is noted that the VOD information file 125 may be several files that are grouped according to particular categories, such as channels, genre, etc.

Although FIG. 1 shows a single content provider 102, a single program guide data provider 104, and a single content distribution system 106, exemplary system 100 can include any number of content providers and/or program guide data providers coupled to any number of content distribution systems.

Client devices 108 can be implemented in a number of ways. For example, a client device 108(1) receives broadcast content from a satellite-based transmitter via a satellite dish 126. Client device 108(1) is also referred to as a set-top box or a satellite receiving device. Client device 108(1) is coupled to a television 128(1) for presenting the content received by the client device (e.g., audio data, video data, and image data), as well as a graphical user interface. A particular client device 108 can be coupled to any number of televisions 128 and/or similar devices that can be implemented to display or otherwise render content. Similarly, any number of client devices 108 can be coupled to a single television 128.

Client device 108(2) is also coupled to receive broadcast content from broadcast network 110 and provide the received content to associated television 128(2). Client device 108(N) is an example of a combination television 130 and integrated set-top box 132. In this example, the various components and functionality of the set-top box are integrated into the television, rather than using two separate devices. The set-top box integrated into the television can receive broadcast signals via a satellite dish (similar to satellite dish 126) and/or via broadcast network 110. In alternate implementations, client devices 108 may receive broadcast signals via the Internet or any other broadcast medium, such as back channel 134 which can be implemented using a protocol such as an Internet protocol (IP), UDP protocol, etc. The back channel 134 may also be implemented with various types of delivery mechanisms, such as an RF back channel (i.e., cable), a modem, or the like. The back channel 134 provides an alternate communication link between each of the client devices 108 and the content distribution system 106. In some instances, the back channel 134 may also provide communication between the client devices 108. However, in a typical implementation, one client device 108 must usually communicate with another client device through a headend service.

The exemplary system 100 also includes stored on-demand content 136, such as Video on Demand (VOD) and/or Pay-Per-View (PPV) movie content (collectively, "purchased content"). The stored on demand content 136 can be viewed with a television 128 via a client device 108 through an onscreen movie guide, for example, and a viewer can enter instructions to stream a particular movie, or other stored content, to a corresponding client device 108.

Exemplary Client Device in a Television-based System

Figure 2:
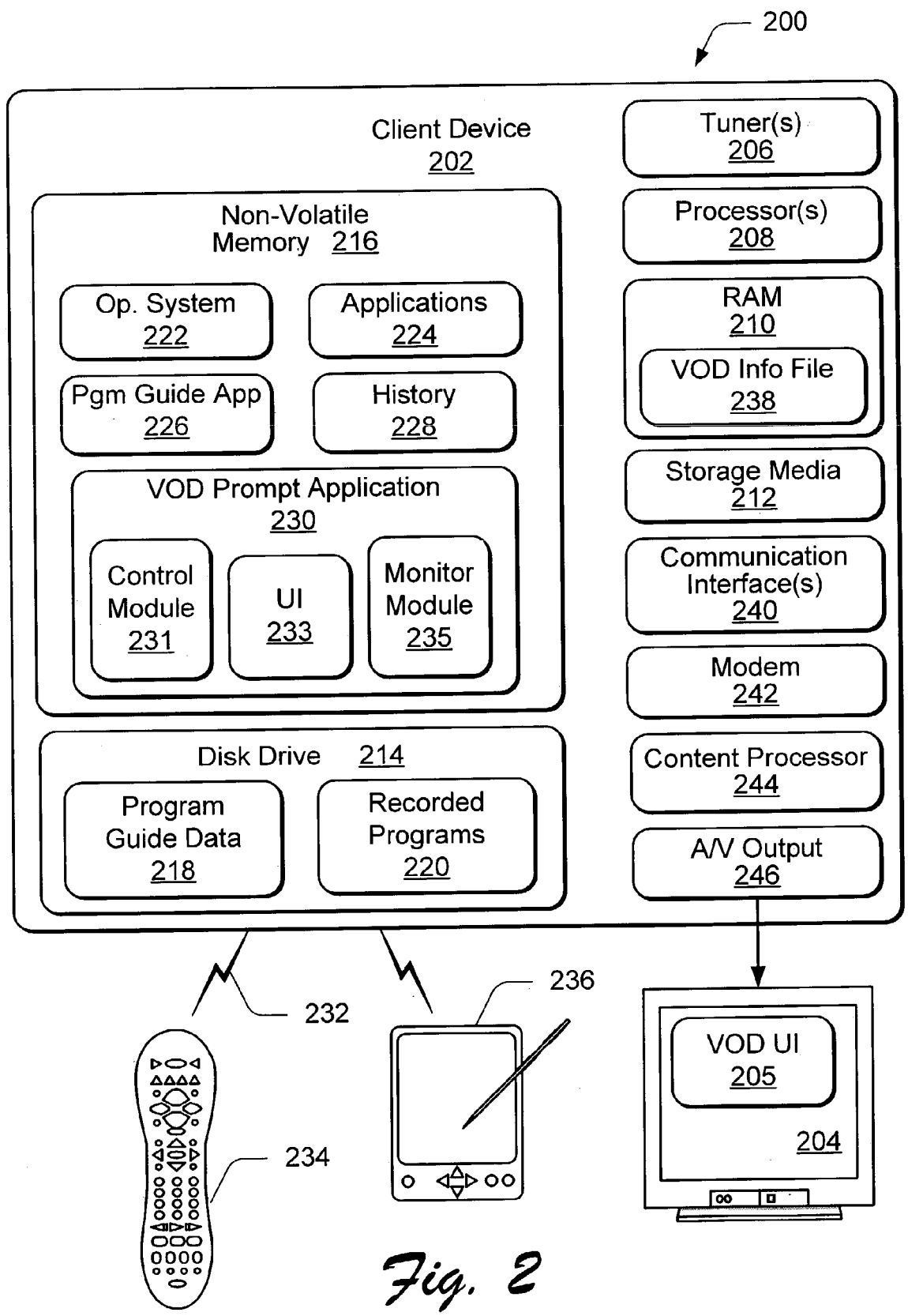
FIG. 2 illustrates a television-based system that includes an exemplary client device on which the described systems and methods can be implemented.

FIG. 2 illustrates a television-based system 200 that includes an exemplary client device 202 that includes components to implement the systems and methods described herein. System 200 also includes a display device 204 to display content received by the client device 202. The client device 202 can be implemented as a set-top box, a satellite receiver, a TV recorder with a hard disk, a digital video recorder (DVR) and playback system, a personal video recorder (PVR) and playback system, a game console, an information appliance, and as any number of similar embodiments.

Client device 202 further includes one or more communication interfaces 240 and a PSTN, DSL, cable, or other type of modem 242. A communication interface 240 can be implemented as a serial and/or parallel interface, as a wireless interface, and/or as any other type of network interface. A wireless interface enables client device 202 to receive control input commands 232 and other information from a user-operated input device, such as from a remote control device 234 or from another infrared (IR), 802.11, Bluetooth®, or similar RF input device. Input devices can include a wireless keyboard or another handheld input device 236 such as a personal digital assistant (PDA), handheld computer, wireless phone, or the like. A network interface and a serial and/or parallel interface enables client device 202 to interact and communicate with other electronic and computing devices via various communication links. Modem 242 facilitates client device 202 communication with other electronic and computing devices via a conventional telephone line, a DSL connection, cable, and/or other type of connection.

Client device 202 can be implemented with one or more memory components, examples of which include a random access memory (RAM) 210, mass storage media 212, a disk drive 214, and a non-volatile memory 216 (e.g., ROM, Flash, EPROM, EEPROM, etc.). It is noted that any further reference made to storing one or more elements in the non-volatile memory 216 encompasses an included reference to one or more other types of memory. Disk drive 214 can include any type of magnetic or optical storage device, such as a hard disk drive, a magnetic tape, a rewriteable compact disc, a DVD, and the like. The one or more memory components store various information and/or data such as received content, program guide data 218, recorded programs 220, configuration information for client device 202, and/or graphical user interface information. Alternative implementations of client device 202 can include a range of processing and memory capabilities, and may include any number of differing memory components than those illustrated in FIG. 2. For example, full-resource clients can be implemented with substantial memory and processing resources, whereas low-resource clients may have limited processing and memory capabilities.

An operating system 222 and one or more application programs 224 can be stored in non-volatile memory 216 and executed on processor(s) 208 to provide a runtime environment. A runtime environment facilitates extensibility of client device 202 by allowing various interfaces to be defined that, in turn, allow application programs 224 to interact with client device 202. The application programs 224 can include a browser to browse the Web (e.g., "World Wide Web"), an email program to facilitate electronic mail, and/or any number of other application programs.

A program guide application 226 that executes on processor(s) 208 is also stored in non-volatile memory 216 and is implemented to process the program guide data 218 for display. The program guide application 226 generates the program guides that enable a viewer to navigate through an onscreen display and locate broadcast programs, recorded programs, video-on-demand movies, interactive game selections, and other media access information or content of interest to the viewer. With the program guide application 226, the television viewer can look at schedules of current and future programming, set reminders for upcoming programs, and/or enter instructions to record one or more programs.

A video on demand prompt application 230 is also stored in the non-volatile memory 216 and is configured to prompt users about interest in video on demand, and also to determine the appropriate time and/or context in which such prompts should be displayed. Also, in at least one other implementation, the video on demand prompt application can actually refer to other regularly scheduled programming together with or apart from the video on demand content The VOD prompt application 230 includes a control module 231, a user interface 233 and a monitoring module 235. The control module 231 controls the basic operations of the VOD prompt application 230. The user interface 233 consists of programmable processor-executable code that, when executed, provides a graphical video on demand user interface (VOD UI) 205 on a display device 204, through which a user may communicate with the VOD prompt application 230. The monitoring module 235 monitors content viewed on the display device(s) 204 to determine when a triggering event occurs that initiates one or more operations of the VOD prompt application 230.

A history module 228 is stored in the non-volatile memory 216 and is associated with the VOD prompt application 230. The history module 228 stores a history of prompts displayed (occurrence of prompt, date and time of occurrence, etc.) by the VOD prompt application 230 so that the VOD prompt application 230 can determine whether a particular prompt should be displayed or withheld because it has already been displayed recently. The history module 228 may also, or alternatively, store a history of the event(s) encountered that caused the prompt(s) to be displayed.

A video on demand information file 238 is stored in the RAM 210 if and when it has been requested by the VOD prompt application 230. If the VOD prompt application 230 displays a prompt to a user for more information on available video on demand, the VOD prompt application 230 requests the VOD information file 125 (FIG. 1) from the content broadcasting system 106. The VOD prompt application 230 then has the information to display to the user.

Client device 202 further includes one or more communication interfaces 240 and a PSTN, DSL, cable, or other type of modem 242. A communication interface 240 can be implemented as a serial and/or parallel interface, as a wireless interface, and/or as any other type of network interface. A wireless interface enables client device 202 to receive control input commands 232 and other information from a user-operated input device, such as from a remote control device 234 or from another infrared (IR), 802.11, Bluetooth, or similar RF input device. Input devices can include a wireless keyboard or another handheld input device 236 such as a personal digital assistant (PDA), handheld computer, wireless phone, or the like. A network interface and a serial and/or parallel interface enables client device 202 to interact and communicate with other electronic and computing devices via various communication links. Modem 242 facilitates client device 202 communication with other electronic and computing devices via a conventional telephone line, a DSL connection, cable, and/or other type of connection.

Client device 202 also includes a content processor 244 which can include a video decoder and/or additional processors to receive, process, and decode broadcast video signals and program data, such as NTSC, PAL, SECAM, or other television system analog video signals, as well as DVB, ATSC, or other television system digital video signals. For example, content processor 244 can include an MPEG-2 or MPEG-4 (Moving Pictures Experts Group) decoder that decodes MPEG-encoded video content and/or image data. The systems described herein can be implemented for any type of video encoding format as well as for data and/or content streams that are not encoded.

Typically, video content and program data includes video data and corresponding audio data. Content processor 244 generates video and/or display content that is formatted for display on display device 204, and generates decoded audio data that is formatted for presentation by a presentation device, such as one or more speakers (not shown) in display device 204. Content processor 244 can include a display controller (not shown) that processes the video and/or display content to display corresponding images on display device 204. A display controller can include a graphics processor, microcontroller, integrated circuit, and/or similar video-processing component to process the images.

Client device 202 also includes an audio and/or video output 246 that provides the audio, video, and/or display signals to television 204 or to other devices that process and/or display, or otherwise render, the audio and video data. Video signals and audio signals can be communicated from client device 202 to television 204 via an RF (radio frequency) link, S-video link, composite video link, component video link, or other similar communication link.

Although shown separately, some of the components of client device 202 may be implemented in an application specific integrated circuit (ASIC). Additionally, a system bus (not shown) typically connects the various components within client device 202. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Exemplary Video On Demand Solicitation Prompt

Figure 3A:
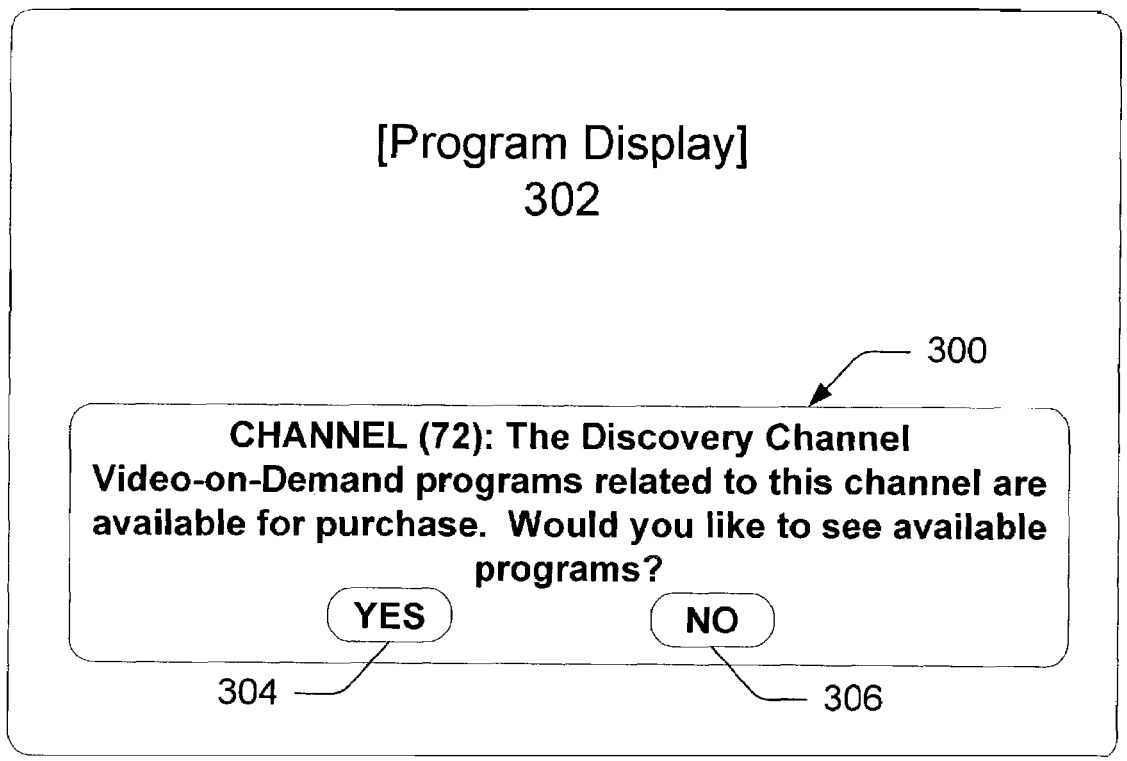
FIG. 3a is an illustration of an exemplary video on demand prompt user interface.

FIG. 3a is an illustration of an exemplary video on demand prompt user interface 300 superimposed on a content program display screen 302. The user interface 300 identifies the channel on which a content program displayed on the display screen 302 is broadcast and prompts a user as to the user's interest in video on demand that is available. The video on demand prompt user interface 300 provides the prompt: "CHANNEL (72): The Discovery Channels®—Video on demand programs related to this channel are available for purchase. Would you like to see available programs?" A "Yes" response button 304 and a "No" response button 306 are provided with the video on demand prompt user interface 300 so that the user may quickly and easily accept or decline the video on demand offerings.

It is noted that the video on demand prompt user interface is exemplary only and may be altered to fit specific implementations. For example, if video on demand is available for free and, therefore, does not have to be purchased, the language of the user interface would explain so. If the related content solicited refers to regularly scheduled content programs, then the language of the user interface would reflect that. Other variations may also be implemented without departing from the scope of the systems and methods described herein.

The video on demand prompt user interface 300 in this example results from monitoring channels viewed by a user and presenting video on demand options to the user based on the channel being viewed. In this instance, the video on demand offerings are all related to "The Discovery Channel."® The only triggering event necessary to provide this particular user interface is a change to "The Discovery Channel."®

Figure 3B:
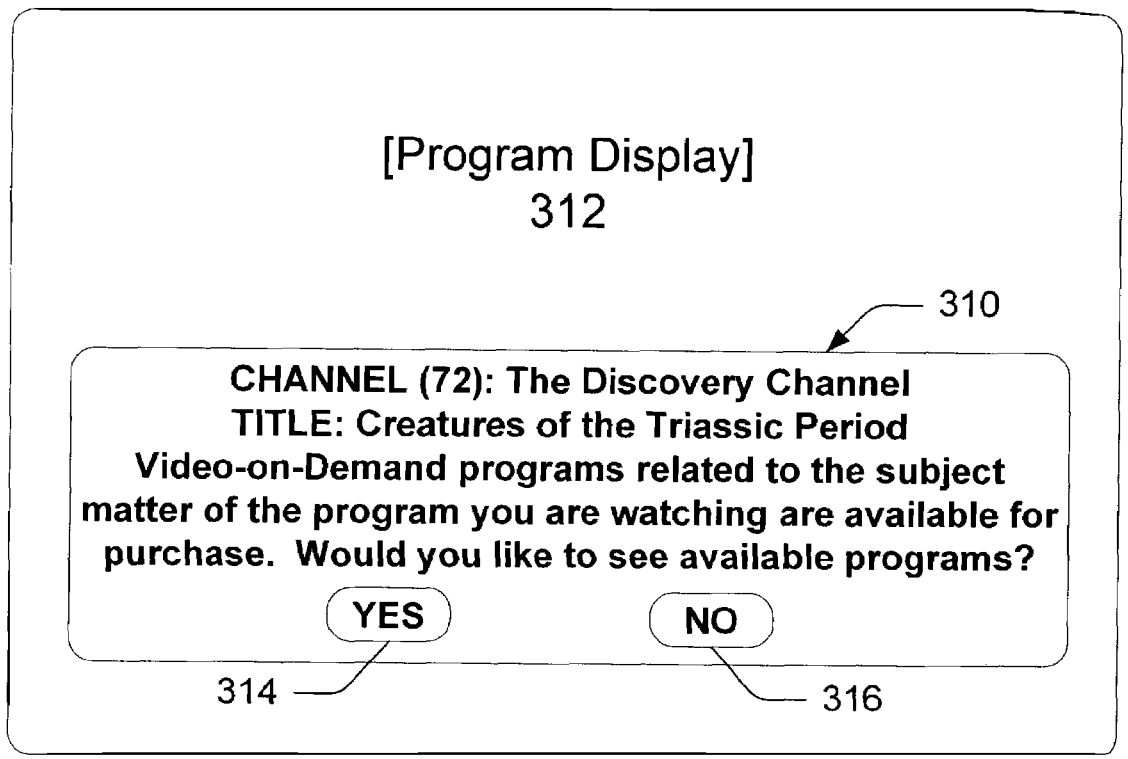
FIG. 3b is an illustration of an exemplary video on demand prompt user interface.

FIG. 3b is an illustration of another exemplary video on demand prompt user interface 310 superimposed on a content program display screen 312. The user interface 310 identifies the channel on which a content program displayed on the display screen 312 is broadcast, a content program title, and prompts a user as to the user's interest in video on demand that is available. Specifically, the video on demand prompt user interface 310 provides the prompt: "CHANNEL (72): The Discovery Channel TITLE: Creatures of the Triassic Period—Video on demand programs related to the subject matter of the program you are watching are available for purchase. Would you like to see available programs?" A "Yes" response button 314 and a "No" response button 316 are provided with the video on demand prompt user interface 310 so that the user may quickly and easily accept or decline the video on demand offerings.

The video on demand prompt user interface 310 in this example results from detecting a trigger embedded in video content received from a content broadcast source. The trigger will be discussed in greater detail below, but is usually a small amount of data containing information about the trigger and the content related to the trigger. Although there is additional work involved in producing the content to embed the trigger, there are some advantages to this alternative implementation.

One advantage is that the amount of data displayed to the user is reduced. Instead of providing video on demand offerings related to the channel, the video on demand offerings shown to the user is only related to the current program subject matter, which is a subset of the all the programs related to the channel. By narrowing the data presented to the user, there is a much higher probability of retaining the user's attention.

In this particular instance, the video on demand offerings are all related to paleontology, dinosaurs, or the Triassic period, etc.

Exemplary Methodological Implementations

Figure 4:
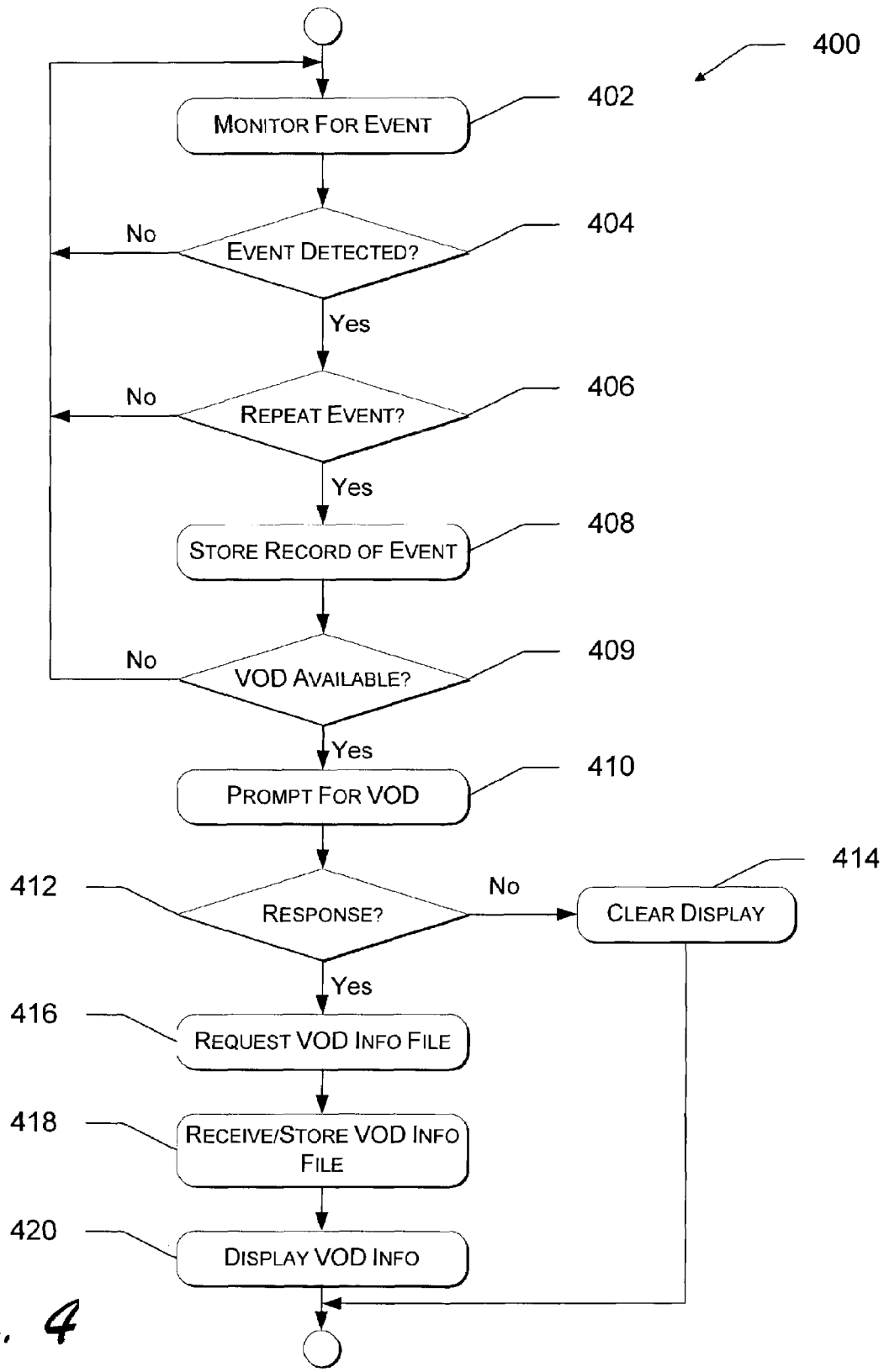
FIG. 4 is a flow diagram depicting a methodological implementation of using broadcast television as an implicit portal for video on demand solicitation.

FIG. 4 is a flow diagram 400 depicting a methodological implementation of using broadcast television as an implicit portal for video on demand solicitation. In the following discussion, continuing reference will be made to the elements and reference numerals shown and described in the previous figures.

At step 402, the monitoring module 226 monitors the content displayed on a user's display device 204 for the occurrence of an event. In the examples discussed previously, the event may be the user tuning to a channel (i.e. switching channels) or the event may be the detection of a trigger embedded in broadcast content. As long as no such event is detected ("No" branch, step 404), the monitoring process continues at step 402.

If an event is detected ("Yes" branch, step 404), then the control module 232 of the VOD prompt application 230 determines if the event is a new, or unique, event or if the event is one that has occurred within a certain time period before this particular event. This may be implemented by utilizing the history module 228 to record event occurrences and refer to the history module 228 when an event is detected to determine if the event has previously occurred within a certain period of time. This is to safeguard against bombarding the user with redundant prompts.

For example, suppose the user has just changed the channel to "Channel 6." If this is the first time that the user has tuned to "Channel 6" then it is appropriate to prompt the user as to the user's VOD preference. However, if the user dealt with the prompt on "Channel 6" just a short time ago, then switched channels and came back to "Channel 6," it would be inappropriate to repeat a prompt to which the user has recently responded. Exactly how long a time may be deemed to be "recent" can be programmed into the system, for example thirty minutes, two hours, a day, etc.

In an implementation that utilizes embedded triggers, the information contained in the trigger may indicate that the trigger event is a unique event or a repeating event. If the event is a unique event, then the associated prompt will be displayed. If the event is a repeating event, then the associated prompt will be displayed the first time the event is encountered, but will be ignored for subsequent encounters of the event.

If the event is a repeat event ("Yes" branch, step 406), then the process reverts to the monitoring process at step 402. If the event is not a repeat event ("No" branch, step 406), then the control module 232 stores a record of the event in the history module 228 at block 408.

If there are one or more VOD offerings related to the event that are available for viewing ("Yes" branch, step 409), then the appropriate video on demand prompt user interface 300, 310 is displayed at step 410. If no VOD content programs related to the event (e.g., if the event is a channel change to a channel that does not offer on-demand programs, or if a trigger references old data that has since been removed) ("No" branch, step 409), then the process reverts to the monitoring process at step 402.

It is noted that in at least one implementations, step 409 may not be required. For example, if the VOD prompt occurs in response to the detection of a trigger embedded in the content, then it may reasonably expected that VOD is available. Other safeguards may also be implemented in conjunction with the techniques described herein.

Furthermore, there are various ways in which the availability of VOD content may be confirmed. In the present example, it is assumed that step 409 is accomplished by sending a message to the content provider(s) 102 to confirm that assets being promoted are available.

The format of the display that shows video on demand content related to the event that is available may be implemented in any one of several ways. For example, available programs may be displayed in a list of titles of the programs. If so, items in the list may be selected to view the content related to the list item. Also, if selection of a list item, i.e., selecting and on-demand program incurs a charge, the list may be linked to a charging mechanism that charges a user account accordingly.

If the user actuates the "No" response button 306, 316 or if a time-out period for a response expires ("No" branch, step 412), then the display is cleared at step 414 and the user continues to view the program that was previously being viewed.

If the user wants to view the available VOD offerings, then the user selects the "Yes" response button 304, 314 ("Yes" branch, step 412) and the control module 232 requests the VOD information file 125 from the content distribution system 106 at step 416. This request is typically an out-of-band request that is made during a regularly scheduled communication between the content distribution system 106 and client device 108 on the broadcast network 110. The VOD information file 125, 238 is received and stored at step 418.

At step 420, the user interface module 234 uses data from the VOD information file 238 to display the video on demand offerings to the user.

Exemplary Broadcast Video Distribution Architecture

Figure 5:
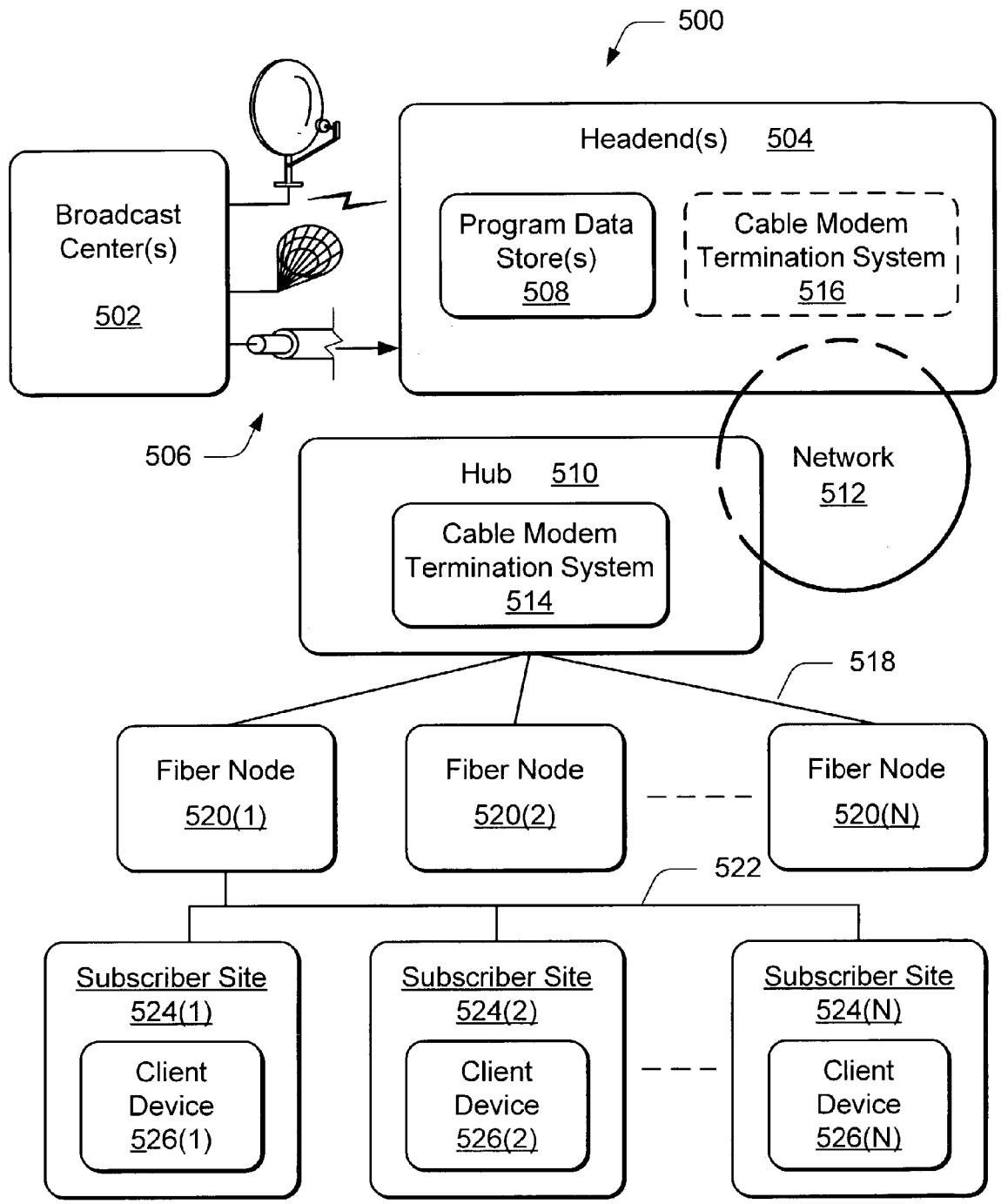
FIG. 5 illustrates an exemplary broadcast video distribution architecture in which the described techniques can be implemented.

The following description relates to a more detail discussion of an environment in which the present systems and methods may be implemented. In FIG. 5, one or more broadcast centers 502 provide broadcast content to one or more headends 504 via one or more transmission media 506. Each broadcast center 502 and headend 504 interfaces with the various transmission media 506, such as a satellite transmission, radio frequency transmission, cable transmission, and/or via any number of other transmission media. A broadcast center 502 can be implemented as a satellite operator, a network television operator, a cable operator, and the like.

A headend 504 includes one or more program data stores 508 to record the broadcast content that is received via a transmission media 506. The broadcast content can be stored, or otherwise recorded, while the broadcast content is in a compressed format, for example, in order to facilitate the ongoing storage of the content over days, weeks, or even indefinitely. The compression format may comport with a Moving Pictures Expert Group (MPEG) algorithm, such as MPEG-2, MPEG-4, and so forth. Other compression technologies may alternatively be employed, such as Microsoft Windows® Media, Advanced Simple Profile (ASP), Cintak®, and the like.

A headend 504 and a hub 510 communicate across a network 512 which can be implemented as a fiber ring that may operate with a packet-based protocol, such as Internet protocol (IP), IP over asynchronous transfer mode (ATM), and other protocols. Packets can therefore be communicated between headend 504 and hub 510, which includes a cable modem termination system 514 for terminating communications from downstream cable modems. Alternatively, headend 504 may include a cable modem termination system 516 to terminate the cable modem communications. Although only one hub 510 is illustrated in architecture 500, a headend 504 can distribute broadcast content to multiple hubs 510 via network 512.

Hub 510 distributes the broadcast content over fiber lines 518 to one or more fiber nodes 520(1), 520(2) . . . 520(N). Each fiber node 520 has one or more coaxial lines 522 over which the broadcast content is output, and each coaxial line 522 includes coaxial line drops to multiple subscriber sites 524(1), 524(2), . . . 524(N). Each subscriber site 524 includes one or more client devices 526(1), 526(2), . . . 526(N), respectively. Subscriber sites 524 can be homes, businesses, and the like with each subscriber site 524 including multiple client devices 526 that are each directly or indirectly interfacing with one or more of coaxial lines 522. Client devices 526 may be computers, set-top boxes of varying capabilities, handheld and/or portable electronic devices, digital televisions, and so forth. Each client device 526 may include an integrated video screen or may be coupled to a video screen.

Figure 6:
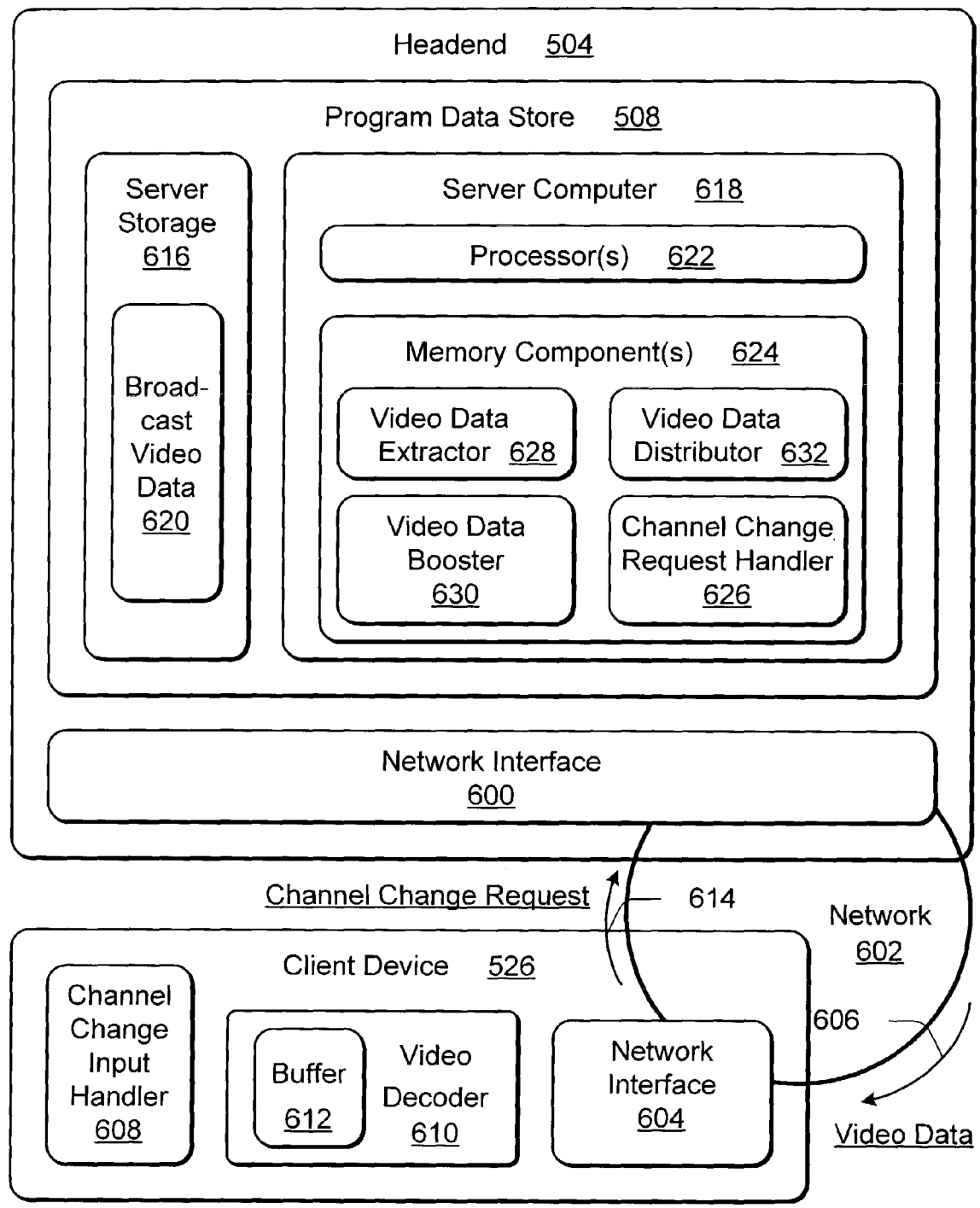
FIG. 6 further illustrates components of the exemplary broadcast video distribution architecture shown in FIG. 5.

FIG. 6 further illustrates an exemplary headend 504 and an exemplary client device 526 as shown in FIG. 5. Headend 504 includes a network interface 600 to communicate over a network 602, and client device 526 includes a network interface 604 to communicate over the network 602. Network 602 can be any two-way unicast network, such as a unicast network that enables point-to-point Internet protocol (IP) sessions, for example. Alternatively, network 602 can be implemented as a video-on-demand (VOD) type network, as a video over digital subscriber line (DSL)-based network, and the like.

Network 602 may include one or more other nodes that are upstream of client device 526 in addition to headend 504. For example, hub 510 (FIG. 5) and fiber nodes 520 may be located between client device 526 and headend 504 for forwarding and/or routing packets or other communications between the devices. Additionally, network 602 can be implemented as a combination of networks and network interfaces 600 and 604 may vary depending on the architecture of network 602. In an exemplary cable network implementation, network interface 600 includes a cable modem termination system (such as system 516 in FIG. 5) if there is not an intervening cable modem termination system in network 602, and network interface 604 includes a cable modem. Network interface 600 and/or network interface 604 may also include components for interacting with an IP network, a DSL network, and so forth. These components may include a receiver, a transmitter, a transceiver, etc. that are adapted to interact with the appropriate network.

In one exemplary implementation, broadcast content distribution from headend 504 to client device 526 is implemented with a point-to-point IP session that is established between headend 504 and client device 526. Broadcast content, such as video data 606 for a specific channel, is streamed to client device 526 across network 602. Thus, each client device 526 receives its own designated broadcast video data stream according to its corresponding requested channel. Further, each fiber node 520 (FIG. 5), if present, has a different current allocation of a two-way portion of the network that is intended for downstream transmissions to client devices 526.

Client device 526 includes a channel change input handler 608 and a video decoder 610, as well as the network interface 604. Video decoder 610 includes a buffer 612 for storing received broadcast content, such as the video data, prior to decoding. Channel change input handler 608 receives channel change input requests from a user of client device 526. A channel change input request can be received from a remote control, a keyboard, a personal digital assistant (PDA), a touch-sensitive screen, integrated keys, and from any other type of input device.

Channel change input handler 608 can be implemented as executable instructions and/or hardware, software, firmware, or some combination thereof. Channel change input handler 608 constructs a channel change request 614 in packet form that includes an indicator of the requested channel. Channel change request 614 is communicated from channel change input handler 608 to network interface 604 of client device 526 for transmission over network 602.

Network interface 600 of headend 504 receives channel change request 614 via network 602, and provides the channel change request 614 to the program data store 508. Program data store 508 includes server storage 616 and a server computer 618. Server storage 616 includes a storage device (not explicitly shown) that comprises mass memory storage, such as a disk-based storage device. Examples of suitable disk-based storage devices and/or systems include a redundant array of independent/inexpensive disks (RAID), a Fibre Channel storage device, and the like.

Server storage 616 stores broadcast video data 620 that is broadcast from a broadcast center 502 (FIG. 5) to headend 504 in a compressed format. In an exemplary implementation, the compressed format comprises a digital stream in accordance with an MPEG protocol, such as MPEG-4. However, other compression formats may alternatively be used. As the compressed digital stream is received at headend 504, it is stored as broadcast video data 620. Server storage 616 can maintain broadcast video data 620 for multiple channels as it is received over hours, days, weeks, and/or indefinitely.

Server computer 618 enables access to the stored, or otherwise recorded, broadcast video data 620 at server storage 616. Server computer 618 includes one or more processors 622 and one or more memory component(s) 624. Although not shown, server computer 618 may also include other components such as input/output interfaces; a local disk drive; hardware and/or software for encoding, decoding, and otherwise manipulating video data, and so forth. A memory component 624 can be implemented as, or include, a non-volatile memory such as disk drive(s) or flash memory and/or volatile memory such as random access memory (RAM). In an exemplary implementation, a memory component 624 includes processor-executable instructions.

Specifically, a memory component 624 includes the following processor-executable instructions: a channel change request handler 626, a video data extractor 628, a video data booster 630, and a video data distributor 632. The processor-executable instructions of memory component 624 can be executed on a processor 622 to implement functions as described below. In alternative implementations, one or more of channel change request handler 626, video data extractor 628, video data booster 630, and video data distributor 632 may be stored in a memory such that they are hardware encoded for automatic execution and/or for faster execution by a processor 622.

Network interface 600 forwards channel change request 614 to channel change request handler 626 that isolates the requested channel from channel change request 614 and provides the requested channel to video data extractor 628. Video data extractor 628 extracts broadcast video data for the requested channel from broadcast video data 620 of server storage 616. Video data distributor 632 communicates the broadcast video data to network interface 600, which transmits the broadcast video data over network 602 as video data packet(s) 606. Client device 526 receives the video data packet(s) 606 via network 602 at network interface 604.

CONCLUSION

Although the subject matter has been described in language specific to structural features and/or methods, it is to be understood that the invention defined by the appended claims is not necessarily limited to the specific features or methods described herein. Rather, the specific features and methods are disclosed as exemplary forms of implementing the claimed systems and methods.

The invention claimed is:

1. A method for facilitating reduction of redundancy of prompts displayed to a user, the method comprising:
   receiving media content from a content broadcasting system;
   displaying the media content that is received;
   monitoring the media content that is displayed to detect an event, wherein the event comprises an occurrence of a trigger embedded in the media content;
   storing the event, wherein a history of events that are detected is maintained;
   maintaining a history of prompts displayed to the user, each displayed prompt corresponding to an associated event;
   determining, based on programmed evaluation criteria applied to the history of events and the history of displayed prompts, when the detected event is a unique event, wherein when a unique event is detected:
      determining one or more video-on-demand offerings associated with the event; and
      providing a displayed prompt to the user that provides a notification that the one or more video-on-demand offerings associated with the event are available, wherein the determining when the detected event is a unique event based on programmed evaluation criteria applied to the history of events and the history of displayed prompts facilitates the reduction of redundancy of prompts displayed to the user, wherein the method is implemented by a client device.

2. The method as recited in claim 1, wherein:
   determining one or more video-on-demand offerings associated with the event comprises:
      identifying one or more video-on-demand offerings associated with the event;
      confirming that the one or more video-on-demand offerings associated with the event are available; and
      the process is terminated without providing a notification that the one or more video-on-demand offerings associated with the event are available if the availability of the one or more video-on-demand offerings associated with the event cannot be confirmed.

3. The method as recited in claim 2, wherein confirming that the one or more video-on-demand offerings associated with the event are available further comprises:
   transmitting a request to a content server; and
   receiving a reply transmission indicating whether or not the one or more video-on-demand offerings associated with the event are available.

4. The method as recited in claim 2, wherein confirming that the one or more video-on-demand offerings associated with the event are available further comprises submitting an out-of-band request for an index file from a content server that contains information about available video-on-demand offerings.

5. The method as recited in claim 1, wherein
   determining one or more video-on-demand offerings associated with the event comprises identifying one or more video-on-demand offerings indicated by data included in the trigger.

6. The method as recited in claim 1, wherein providing a notification that the one or more video-on-demand offerings associated with the event are available further comprises displaying a prompt user interface that includes the notification and means for receiving a user response indicating whether or not the user is interested in receiving more information about the one or more video-on-demand offerings.

7. The method as recited in claim 6, wherein displaying a prompt user interface that includes the notification and means for receiving a user response indicating whether or not the user is interested in receiving more information about the one or more video-on-demand offerings comprises displaying a list of one or more selectable list items, each selectable list item being associated with an available video-on-demand offering associated with the event.

8. The method as recited in claim 1, further comprising, when an event is detected:
   determining if the event is a repeating event; and
   if the event is a repeating event, and if the event has previously occurred during a specified time period, terminating the process without providing the notification.

9. The method as recited in claim 1, further comprising, when an event is detected:
   determining if the event has previously occurred and caused the notification to be provided;
   determining if the notification should be provided again if the event has previously occurred and caused the notification to be provided; and terminating the process without providing the notification if it is determined that the notification should not be provided.

10. The method as recited in claim 9, wherein determining if the event has previously occurred further comprises determining if the event has previously occurring during a specified time period.

11. A client device communicatively coupled to a content broadcasting system, the client device comprising:
   a processor;
   memory;
   a monitor module configured to monitor the client device for events associated with media content received from the content broadcast system and detect occurrences of such events;
   a history module to maintain a history of user prompts provided to a user of the client device, each user prompt corresponding to an occurrence of an event;
   a control module configured to identify one or more content programs associated with a detected event, wherein the control module utilizes specified evaluation criteria applied to the history of user prompts to determine if a detected event is associated with a unique event or with a repeating event, wherein determining when a detected event is associated with a unique event or with a repeating event facilitates a reduction of redundancy of user prompts;
   a user interface module configured to:
      provide a user prompt informing a user that one or more content programs associated with a detected event are available;
      receive a response to the user prompt; and
      display program information regarding the one or more content programs associated with the event if the response to the user prompt is a request to display the program information.

12. The client device as recited in claim 11, wherein the user interface module is further configured to display the user prompt and the program information on a display device connected to the client device.

13. The client device as recited in claim 11, wherein the user interface module is further configured to display the user prompt and the program information on a display device integrated with the client device.

14. The client device as recited in claim 11, further comprising non-volatile memory that stores the monitor module, the control module and the user interface module.

15. The client device as recited in claim 11, wherein:
   the control module is further configured to determine if a detected event has previously occurred; and
   the user interface module is further configured to provide the user prompt, receive a response to the user prompt and display program information only if the detected event has not previously occurred.

16. The client device as recited in claim 15, further comprising a history file that stores occurrences of events, and wherein the control module is further configured to reference the history module to determine if a detected event has previously occurred.

17. The client device as recited in claim 11, wherein:
   the control module is further configured to determine if a detected event has previously occurred during a specified time period; and
   the user interface module is further configured to provide the user prompt, receive a response to the user prompt and display program information only if the detected event has not previously occurred during the specified time period.

18. The client device as recited in claim 11, wherein the control module is further configured to confirm availability of content programs associated with the event and forego providing the user prompt, receiving a response to the user prompt and displaying program information if the availability cannot be confirmed.

19. The client device as recited in claim 11, wherein:
   at least one event comprises a trigger embedded in the media content; and
   the control module identifies one or more content programs associated with the at least one event based on data included in the embedded trigger.

20. The client device as recited in claim 11, wherein identifying one or more content programs associated with detected events comprises requesting and receiving a content index file from a content server in the content broadcasting system, the content index file containing information that identifies the one or more content programs.

21. The client device as recited in claim 20, wherein the request for the content index file is an out-of-band request.

22. The client device as recited in claim 11, wherein the user interface module is further configured to:
   provide a "yes" response button and a "no" response button with the user prompt; and
   receive a response to the user prompt by identifying an actuation of the "yes " response button or the "no" response button.

23. The client device as recited in claim 11, wherein the user interface module is further configured to display program information in a list of one or more selectable items.

24. The client device as recited in claim 11, wherein the one or more content programs associated with the events are video-on-demand content programs.

25. One or more computer-readable storage media containing computer-executable instructions that, when executed on a computer, perform a method, the method comprising:
   monitoring in a client device to detect an occurrence of a condition, the client device being configured to receive broadcast media content via multiple channels of a content broadcasting system;
   maintaining in the client device a history of displayed prompts, wherein each displayed prompt corresponds to an occurrence of a condition;
   determining in the client device based on specified evaluation criteria applied to the history of displayed prompts, when the occurrence of the detected condition is unique, wherein when the occurrence of the detected condition is unique, providing a user-selectable option that comprises a displayed prompt that facilitates a user to receive program information about one or more content programs related to broadcast media content currently being accessed;
   receiving a response to the user-selectable option; and
   displaying the program information if the response to the user-selectable option is an indication to display the program information, wherein the determining when the occurrence of the detected condition is unique facilitates a reduction of redundancy of displayed prompts.

26. The method as recited in claim 25, wherein the user-selectable option further comprises a notice on the displayed prompt that content programs related to the broadcast media content currently being accessed are available.

27. The method as recited in claim 25, further comprising:
   confirming the presence of the program information; and wherein the user-selectable option and the program information are only displayed if the presence of the program information has been confirmed.

28. The method as recited in claim 27, wherein the confirming further comprises:

transmitting a confirmation request to a content server of the content broadcasting system; and receiving a server response to the confirmation request confirming that the program information is present.

29. The method as recited in claim 27, wherein the confirming further comprises:

submitting a confirmation request during a scheduled communication period; and receiving an out-of-band index file that confirms the presence of the program information.

30. The method as recited in claim 25, wherein the one or more content programs related to the broadcast media content currently being accessed are video on demand content programs.

31. The method as recited in claim 25, wherein the one or more content programs related to the broadcast media content currently being accessed are content programs that have a viewing fee associated with them.

32. The method as recited in claim 25, further comprising:

when an occurrence of a condition is detected, determining if the occurrence of the condition is a repeat occurrence of the condition; and if the occurrence of the condition is a repeat occurrence of the condition, aborting the process without displaying the user-selectable option of the program information.

33. The method as recited in claim 32, wherein determining if the occurrence of the condition is a repeat occurrence of the condition further comprises:

referencing a history file that contains previously detected occurrences of conditions; and determining that the occurrence of the condition is a repeat occurrence of the condition if an indication of an occurrence of the condition is contained in the history file.

34. The method as recited in claim 32, wherein:

the condition is a trigger embedded in broadcast media content received from the content broadcasting system; and the determining if the occurrence of the condition is a repeat occurrence of the condition further comprises identifying data in the trigger that indicates that the trigger is a unique condition, which indicates that the occurrence of the condition is not a repeat occurrence of the condition.

35. The method as recited in claim 25, further comprising recording the detection of the occurrence of the condition in a history file.

36. The method as recited in claim 35, further comprising recording in the history file, a time at which the occurrence of the condition was detected.

* * * * *